(12) United States Patent
Tom

(10) Patent No.: US 6,935,354 B2
(45) Date of Patent: Aug. 30, 2005

(54) PERMEABLE GAS ASSEMBLY FOR GAS DELIVERY

(75) Inventor: Glenn Tom, New Milford, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 174 days.

(21) Appl. No.: 10/314,728

(22) Filed: Dec. 9, 2002

(65) Prior Publication Data
US 2004/0107997 A1 Jun. 10, 2004

(51) Int. Cl.$^7$ .............................. F16K 1/32; G05D 16/04
(52) U.S. Cl. ................. 137/1; 137/505.39; 137/625.33; 137/625.49
(58) Field of Search ............................ 137/505, 505.39, 137/625.33, 625.39, 625.49, 1; 251/117, 127

(56) References Cited

U.S. PATENT DOCUMENTS

| | | | | |
|---|---|---|---|---|
| 2,887,129 A | * | 5/1959 | Stear | 138/43 |
| 3,682,437 A | * | 8/1972 | Miller | 251/61.2 |
| 4,397,331 A | * | 8/1983 | Medlar | 137/375 |
| 4,398,563 A | * | 8/1983 | Kay et al. | 138/42 |
| 4,429,714 A | * | 2/1984 | Hughes et al. | 137/625.3 |
| 4,436,098 A | * | 3/1984 | Kaufman | 600/579 |
| 5,518,528 A | | 5/1996 | Tom et al. | |
| 5,704,965 A | | 1/1998 | Tom et al. | |
| 5,704,967 A | | 1/1998 | Tom et al. | |
| 5,707,424 A | | 1/1998 | Tom et al. | |

* cited by examiner

Primary Examiner—Stephen M. Hepperle
(74) Attorney, Agent, or Firm—Marianne Fuierer; Yongzhi Yang; Maggie Chappuis (57) ABSTRACT

A valve assembly for controlling gas delivery from a higher pressure fluid source to a lower pressure processing tool comprising a valve poppet movingly engageable with a valve seating member and a fluid permeable insert positioned between the valve poppet and the valve seating member that is unexposed to flowing fluid when the valve poppet is in a closed position thereby preventing fluid flow through the valve assembly and provides a diffusional path for transfer of all flowing fluid when the valve poppet is in an open position. The permeable insert can be inserted into the sealable and engageable surface of either the valve seat member or the valve poppet.

19 Claims, 5 Drawing Sheets

PERMEABLE GAS ASSEMBLY FOR GAS DELIVERY

BACKGROUND OF INVENTION

1. Field of the Invention

The present invention relates to a gas valve assembly, and more particularly, to a permeable gas valve assembly that controls fluid flow from a downstream fluid source to an upstream processing tool.

2. Description of the Related Art

Many industrial processing and manufacturing applications require the use of highly toxic fluids. The manufacture of semiconductor materials represents one such application wherein the safe storage and handling of highly toxic hydridic or halidic gases becomes necessary. Examples of such gases include silane, germane, ammonia, phosphine, arsine, stibine, hydrogen sulfide, hydrogen selenide, hydrogen telluride, and other halide compounds. As a result of toxicity and safety considerations, these gases must be carefully stored and handled in the industrial process facility. The semiconductor industry in particular relies on the gaseous hydrides of arsine ($AsH_3$) and phosphine ($PH_3$) as sources of arsenic (As) and phosphorus (P) in ion implantation. Ion implantation systems typically use dilute mixtures of $AsH_3$ and $PH_3$ at pressures as high as 1500 psig. Due to their extreme toxicity and high vapor pressure, their use, transportation and storage raise significant safety concerns for the semiconductor industry.

For example, arsine is an extremely toxic gas that is used by the semiconductor industry and typically stored in pressurized containers at about 250 psi. The handling of arsine cylinders in production environments presents a wide variety of hazardous situations. A leak in one 140 gram cylinder of arsine could contaminate the entire volume of a 30,000 square foot building with 10 foot high ceilings to the Immediate Danger to Life and Health (IDLH) level. If the leak was large, the contamination could occur in a few minutes, which would mean that for many hours there would be extremely deadly concentrations in the area near the source of the spill.

Gas pressure regulating valves of the type for delivering gas at a relatively low pressure, have been known and used for many years. However, these valves are subject to leakages of the highly pressurized gas along valve stems. Unless some provision is made for preventing such leakage, the build-up of high pressure gas leakage in trapped volumes within the valve device can introduce an unintended bias into the regulator and produced distortion of the delivery control. In order to nullify the effect of leakage, some pressure regulating valves resort to the use of a constantly open atmospheric vent port for releasing gas leakage directly to the atmosphere. Clearly, in the case of inflammatory gas or explosive gases the possible accumulation of released gas in a confined area becomes a serious health and safety hazard, and an open port is not an option.

In view of the serious potential for injury or death that could result from an unintended release of these fluids, the prior art discloses systems for preventing such catastrophic release of toxic fluids. U.S. Pat. Nos. 5,704,965; 5,704,967; 5,707,424; and 5,518,528 teach systems for storage and dispensing of hydridic and halidic gases which operate at ambient temperature by using a pressure reduction to desorb toxic fluids from zeolite materials having high storage (sorptive) capacity for these gases. However, the purity of the gas is reduced due to residual absorbant material that may be entrained within the discharging gas.

Accordingly, there is a need in the art for a gas assembly delivery system that avoids the disadvantages of known delivery systems including the avoidance of releasing highly pressurized toxic gases directly to the atmosphere or reducing the purity of the discharged fluid due to entrained absorbent material.

It is a broad object of this invention to reduce the possibility of accidental spillage or release of toxic liquid or gases.

Another object of this invention is to eliminate the need for sorbents to control the handling, storage and delivery of toxic fluids.

A further object of this invention is to provide a discharge system that constrains the flow of gas during normal operation as well as during any kind of valve mishandling or valve failure.

SUMMARY OF THE INVENTION

The present invention relates to a gas delivery valve device that provides a controlled communication from the fluid source through the valve device to the processing tool.

In one aspect, the present invention relates to a permeable fluid valve assembly for delivery of a fluid from a fluid source to a downstream processing tool comprising;

an inlet port for communication with an outlet of a fluid source for flowing fluid from the fluid source;

a permeable valve device positioned downstream from the fluid source comprising a valve member and a permeable valve seat member;

wherein the valve device is adapted for movement between a sealing position that blocks fluid flow through the inlet port and an open position that permits fluid flow through the inlet port and valve device;

wherein the valve member has a first end and a second end and the first end is positioned in the inlet port;

wherein the valve seat member has an abutting first end having an outflow bore therethrough for acceptance of an extension attached to at least a section of the second end of the valve member; and wherein the abutting first end of the valve seat member comprises an insert that is conformingly configured for engagement with the second end of the valve member and fabricated of a fluid permeable material for transference of the fluid from the fluid source through the inlet port and the permeable section of the valve seat member to the downstream processing tool when the valve device is in the open position.

The present invention further relates to fluid discharge from a pressurized tank and through the permeable valve device, wherein the permeable valve device is communicatively connected to a chamber surrounding a diaphragm. The diaphragm defines an interior volume isolated from pressure conditions upstream of the valve device and engaged with the extension at the second end of the valve member to control the movement of the valve member in a manner that retains the valve member in the sealing position until a pressure differential between the interior volume of the diaphragm and the interior of the chamber moves the valve member to the open position. The valve member may be further retained in the sealing position by a resilient means positioned adjacent and contacting an area of the first end of the valve member.

The valve member is preferably an elongated structure wherein the first end extension has a reduced cross-sectional dimension relative to the inlet port to provide sufficient space for passing the fluid through the inlet port and the permeable section of the valve device. The second end extension may further comprise a tip with a reduced cross-sectional dimension relative to the remainder of the second end extension to provide sufficient space in the bore for filling of the fluid source when the valve member is moved to the fully open fill position.

In another aspect, the present invention relates to a permeable fluid valve assembly for delivery of a fluid from a fluid source to a downstream processing tool comprising;
   an inlet port for communication with an outlet of a fluid source for flowing fluid from the fluid source;
   a valve device positioned downstream from the fluid source comprising a valve member and a valve seat member,
      wherein the valve device is adapted for movement between a sealing position that blocks fluid flow through the inlet port and an open position that permits fluid flow through the inlet port and valve device,
      wherein the valve member has a first end and a second end, wherein the first end is positioned in the inlet port; and
      wherein the valve seat member has an abutting first end having a bore therethrough for acceptance of an extension attached to at least a section of the second end of the valve member; and
      wherein the extension at the second end of the valve member is fabricated of a fluid permeable material for transference of the fluid from the fluid source through the inlet port, through the permeable extension of the valve member and then to the outflow bore of the valve seat member to the downstream processing tool when the valve device is in an open position.

When the components of the present valve assembly are not engaged and thus in an open position for providing for movement of fluid through the inlet port, preferably a portion of the valve member extension remains in engaged with and contacting the side walls of the outflow bore in the valve seat member to facilitate movement of substantially all fluid through the permeable material portion of the valve device to the downstream processing tool, e.g., the seat member in one embodiment or the permeable extension of the valve member in the second embodiment.

For effectiveness the valve device may be included in a regulator housing, within the fluid source container or adjacent to the exterior of the fluid source container. A location within the fluid source container offers the most protection to the regulator and its fail safe operation.

In yet another aspect, the present invention relates to a permeable valve assembly for controlling gas delivery from a higher pressure fluid source to a lower pressure processing tool comprising:
   a valve poppet movingly engageable with a valve seating member; and
   a fluid permeable insert positioned between the valve poppet and the valve seating member that is isolated from flowing fluid when the valve poppet is sealingly engaged with the valve seating member thereby preventing fluid flow through the valve assembly, wherein the fluid permeable insert provides a diffusional path for transfer of all flowing fluid from the higher pressure fluid source when the valve poppet is not sealingly engaged with the valve seating member, and wherein the permeable insert can be inserted into the sealable and engageable surface of either the valve poppet or the valve seating member.

In a further aspect, the present invention relates to a method for discharging fluid from a fluid source container to a downstream processing tool while reducing uncontrolled discharge of fluid from the container, the method comprising:
   connecting an outlet port of a fluid source container to an inlet port of a valve assembly device comprising:
   a valve member and a permeable valve seat member;
      wherein the valve device is adapted for movement between a sealing position that blocks fluid flow through the inlet port and an open position that permits fluid flow through the inlet port and valve device;
      wherein the valve member has a first end and a second end and the first end is positioned in the inlet port;
      wherein the valve seat member has an abutting first end having an outflow bore therethrough for acceptance of an extension attached to at least a section of the second end of the valve member; and
      wherein the abutting first end of the valve seat member comprises an insert that is conformingly configured for engagement with the second end of the valve member and fabricated of a fluid permeable material for transference of the fluid from the fluid source through the inlet port and the permeable section of the valve seat member to the downstream processing tool when the valve device is in the open position; and
   flowing fluid from the fluid source container through the inlet port, permeable valve seat member, outflow port to a downstream processing tool.

Likewise, the present invention relates to a method for discharging fluid from a fluid source container to a downstream processing tool while reducing uncontrolled discharge of fluid from the container, the method comprising:
   connecting an outlet port of a fluid source container to an inlet port of a valve assembly device comprising:
   a valve member and a valve seat member;
      wherein the valve device is adapted for movement between a sealing position that blocks fluid flow through the inlet port and an open position that permits fluid flow through the inlet port and valve device,
      wherein the valve member has a first end and a second end, wherein the first end is positioned in the inlet port; and
      wherein the valve seat member has an abutting first end having a outflow bore therethrough for acceptance of an extension attached to at least a section of the second end of the valve member; and
      wherein the extension at the second end of the valve member is fabricated of a fluid permeable material for transference of the fluid from the fluid source container through the inlet port, through the permeable extension of the valve member and the outflow bore of the valve seat member to the downstream processing tool when the valve device is in an open position; and
   flowing fluid from the fluid source container through the inlet port, permeable valve member extension, outflow port to a downstream processing tool.

The above and other aspects and advantages of the invention will become apparent from the following more detailed description, taken in conjunction with the accompanying drawings.

DETAILED DESCRIPTION OF THE INVENTION AND THE PREFERRED EMBODIMENT THEREOF

In accordance with the present invention, controlled discharge of a pressurized fluid, such as a pressurized toxic gas from a fluid source is accomplished by diffusing the gas through a permeable section of a valve assembly device.

Figure 1:
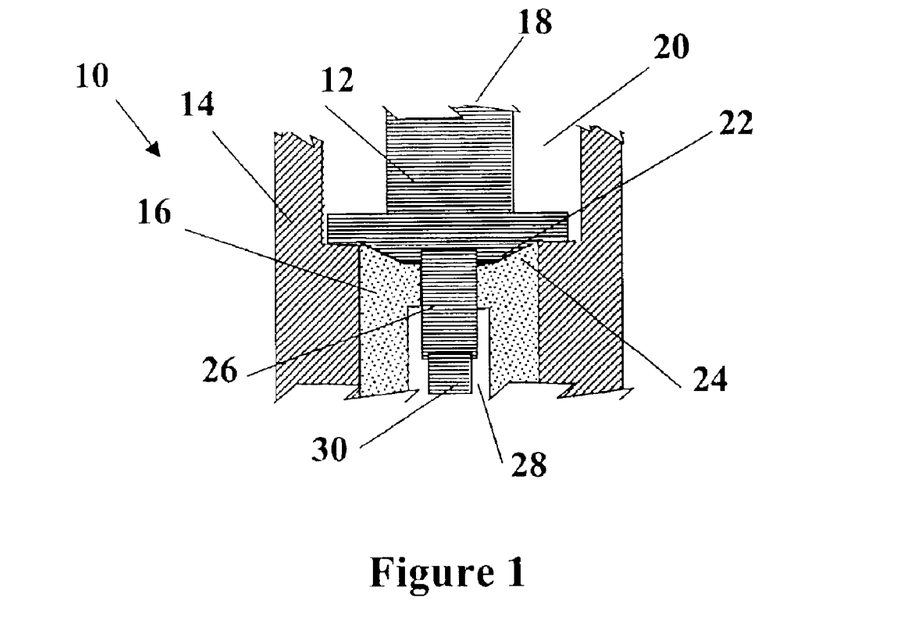
FIG. 1 is a side elevational view of a permeable valve device of the present invention showing the permeable valve seat and valve poppet in a closed and sealing position.
Figure 2:
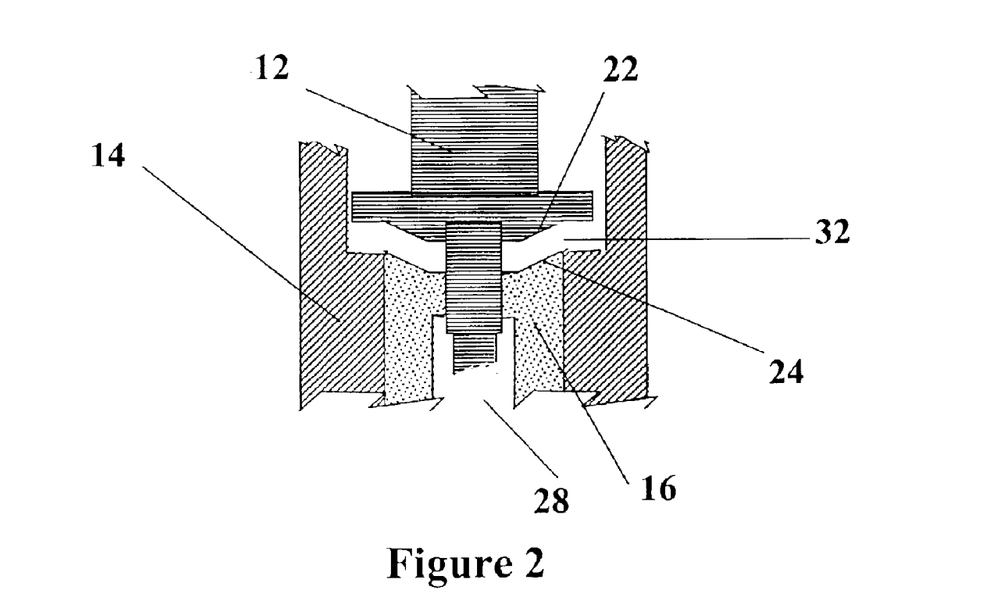
FIG. 2 is a side elevational view of a permeable valve device of the present invention showing the permeable valve seat and valve poppet in an open and discharging mode.
Figure 3:
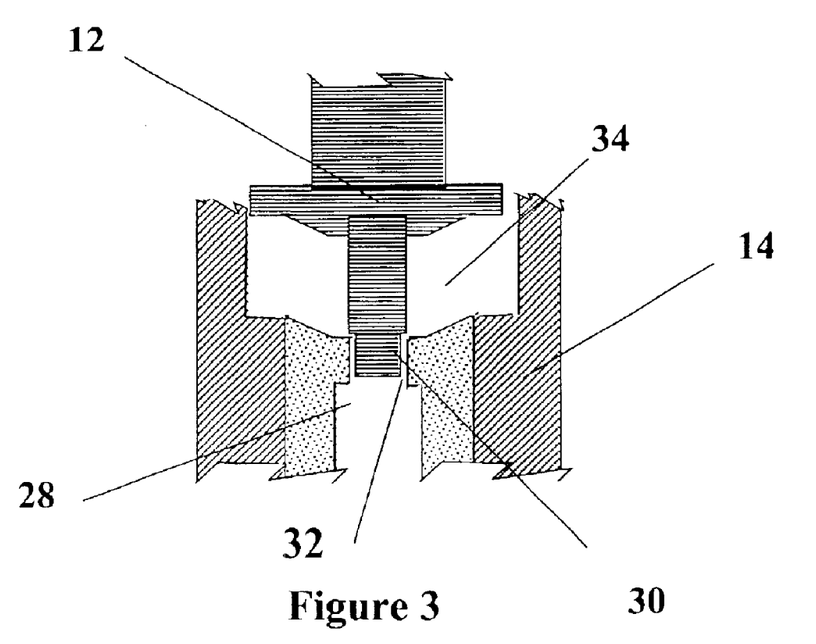
FIG. 3 is a side elevational view of a permeable valve device of the present invention showing the permeable valve seat and valve poppet in a filling mode.

Referring to FIGS. 1–3, a valve assembly device in accordance with the present invention is generally depicted at 10 having a valve member 12 (poppet) and a valve seat member 14. Enclosed within the valve seat member is an insert 16 fabricated of a permeable material for diffusing gas therethrough. Although not shown, a source of fluid under pressure is preferably disposed immediately upstream from the valve assembly. Downstream of the valve assembly is a processing tool (not shown) that requires fluid at low pressure. The valve assembly device of the present invention controls passage of fluid from the source to the downstream tool.

Valve member 12 comprises a first end extension 18 which in FIGS. 1–3 extends axially outward and is of sufficient length to extend into the inlet port 20, the line that is attached to the fluid source for transference of the fluid to the valve assembly. The first end extension 18 has a smaller cross-sectional dimension relative to the dimension of the inlet port to provide sufficient space for movement of the discharging fluid from the fluid source through the inlet port. On the second end of the valve member is a seating or abutting surface 22 that engages with a corresponding reversely configured surface 24 of the permeable valve seat member 14. The second end of the valve member further comprises an extension 26 that extends into an outflow bore 28 that extends into and traverses through the permeable valve seat member.

FIG. 1 illustrates one embodiment of the permeable valve assembly of the present invention wherein the valve poppet member 12 is fully engaged with the permeable valve seat member 14 to form a sealing junction to prevent fluid flow from the fluid source to the processing tool. The contacting surface 24 of the permeable material insert 16 is completely isolated from the fluid source by the valve member surface 22 and extension 26 both of which are fabricated of an impermeable material FIG. 2 illustrates the permeable valve assembly in the operating position for flow of fluids from the fluid source through the inlet port, around the head of the valve member and through the permeable insert 16 of the valve seat member 14. Preferably, the extension 26 is sized to fit within the outflow bore so that all dispensed fluid passes through the permeable material. An o-ring may be further included to provide a movable seal to insure transference of fluids through only the permeable insert 16.

FIG. 3 shows the present embodiment in the fill mode. To facilitate quick refilling of the fluid source, the valve member extension 26 is fully extended away from the valve seat member 14. Preferably, the extension 26 is structurally configured to include a smaller dimensional end 30 that provides a space or gap 32 between the inner surface of the outflow bore 28 and the narrowed end 30 of valve member extension 26 to provide for fluid flow and transference of fluid to the fluid source.

Figure 4:
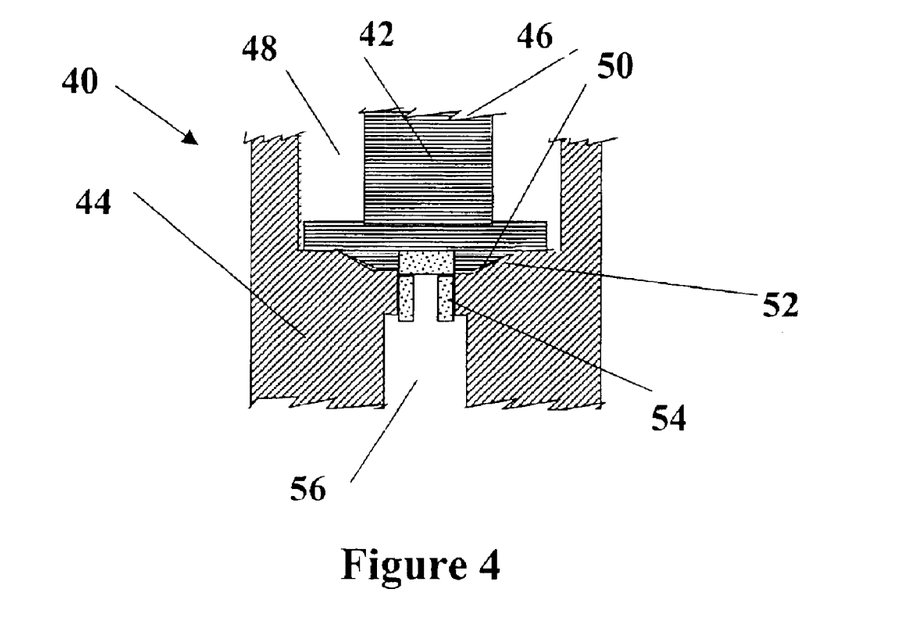
FIG. 4 is a side elevational view of another embodiment of the present invention showing the valve seat and valve poppet having a permeable extension in a closed and sealing position.

FIG. 4 shows another embodiment of the present invention where the permeable valve assembly 40 comprises a permeable valve member 42 and a valve seat member 44. Permeable valve member 42 comprises a first end extension 46 which in FIGS. 4–7 extends axially outward and is of sufficient length to extend into the inlet port 48, the line that is attached to the fluid source for transference of the fluid to the valve assembly. The first end extension 46 has a smaller cross-sectional dimension relative to the dimension of the inlet port to provide sufficient space for movement of the discharging fluid from the fluid source through the inlet port. On the second end of the valve member is a seating or abutting surface 50 that engages with a corresponding reversely configured surface 52 of the valve seat member 44. The second end of the valve member further comprises a permeable extension 54 that extends into an outflow bore 56 that traverses through the valve seat member.

Figure 5:
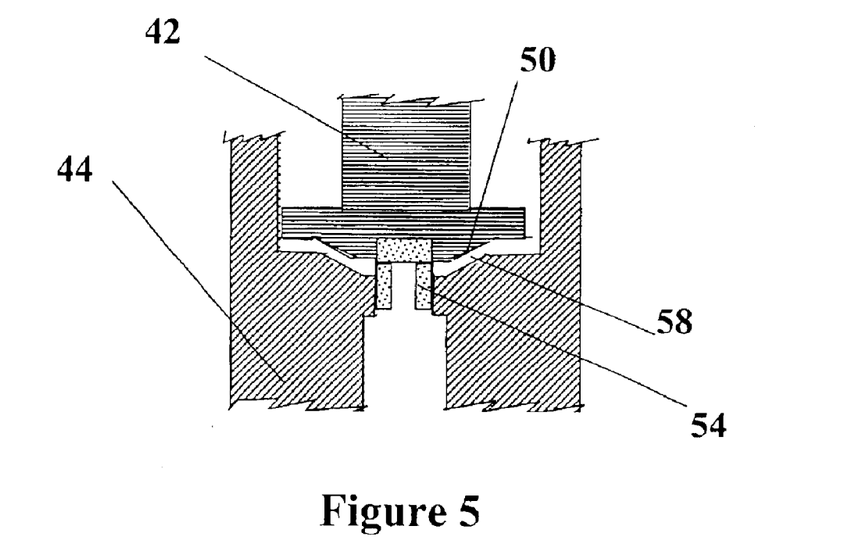
FIGS. 5 and 6 show the valve assembly of FIG. 4 in different stages of discharge through the permeable extension of the valve poppet.
Figure 6:
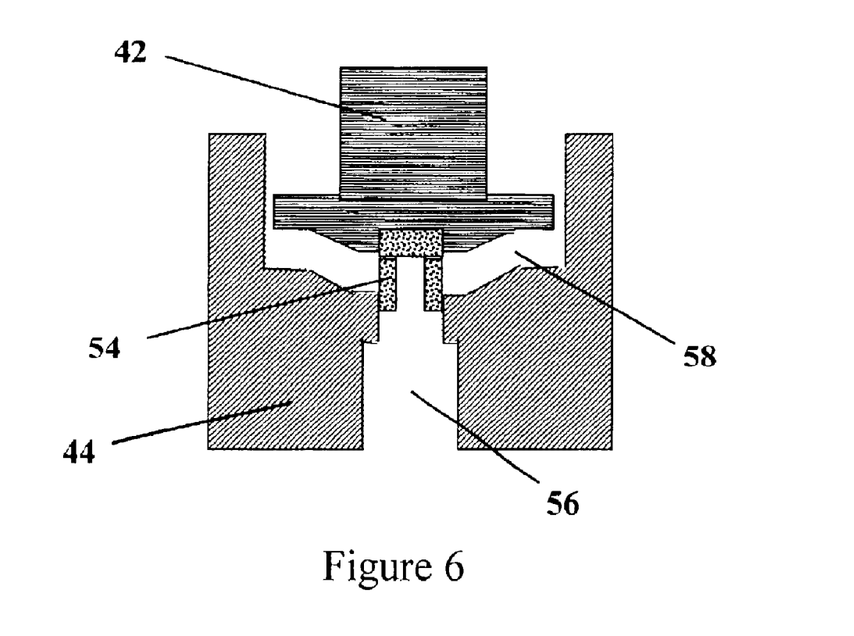

In this embodiment, the permeable extension 54, attached to the valve member (poppet), provides a diffusible surface for controlled transference of gases from the upstream fluid source to the downstream processing tool. In FIG. 4, the valve member surface, and the permeable extension 54 are fully engaged with the valve seat member 44 and outflow bore 56 to form a sealing junction to prevent fluid flow from the fluid source to the processing tool. The permeable extension 54, is completely isolated from the fluid source by the sealing junction of valve member surface 50 and valve seat surface 52 both of which are fabricated of an impermeable material FIGS. 5 and 6 illustrate the permeable valve assembly in the operating position for low and higher flow of fluids from the fluid source through the inlet port, through a channel 58 around the head of the valve member and through the permeable wall of permeable extension 54 to the outflow bore 56. Preferably, the permeable extension 54 is sized to fit within the outflow bore so that all dispensed fluid passes through the permeable material to the downstream processing tool.

Figure 7:
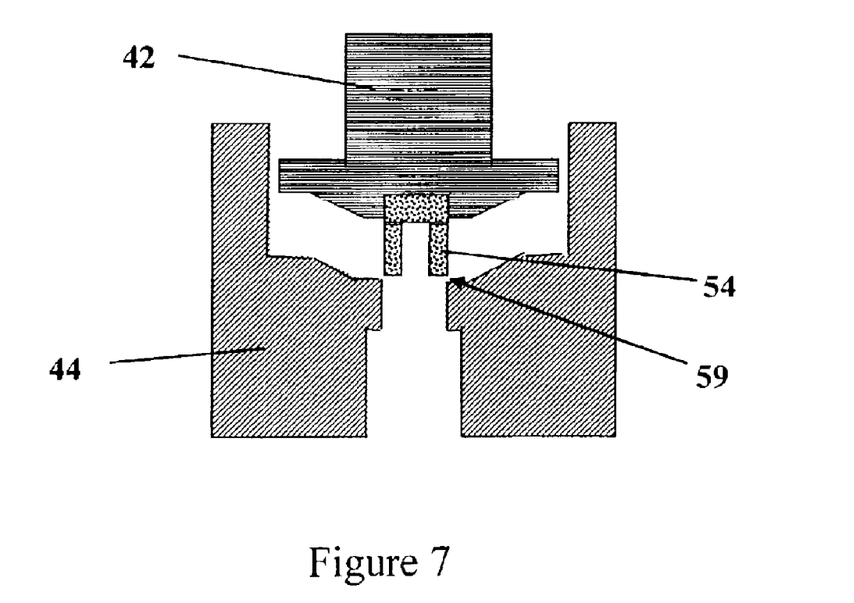
FIG. 7 shows the valve assembly of FIG. 4 fully extended in the fill mode for easy and quick filling.

FIG. 7 shows this embodiment in the fill mode. To facilitate quick refilling of the fluid source, the permeable valve member extension 54 is fully extended away from the valve seat member 44. In the fill mode, the extended member 54 exposes a groove 59 that facilitates easy filing of the fluid source by bypassing the permeable extension 54 and entering directly into inlet port.

The permeable material fabricated into the valve assembly causes a slight drag that controls the high flow of the fluid that is limited by the pressure and temperature of the fluid and also the permeability of the permeable material. This diffusing factor reduces the potential that pressure spikes will result downstream. Generally any permeable material that is vapor/gas permeable and preferably liquid impermeable may be used and formed of a wide variety of potentially useful materials, including, for example, polypropylene, polyvinylidene fluoride, polytetrafluoroethylene, polyfluoroacetate, and silicone. One preferred useful material comprises polyvinylidene fluoride.

Permeation of gases through polymers is a well-know phenomenon and tabulated permeability values of a wide variety of materials potentially suitable for the permeation insert or permeable valve extension may be employed to design a gas delivery system in accordance with the present invention.

In general, the permeation of a gas through a polymeric film is determined by the following equation R=P×SA wherein R=permeation rate, P is the permeation constant for a given polymeric material, at standard temperature and pressure, and SA is the surface area of the permeation surface. Thus, it is possible to control the rate of permeation by a number of means including; changing the temperature that will change the vapor pressure and diffusion constant across the permeable wall; changing the thickness of the permeable wall; and mechanically changing the exposed surface area in the diffusion system by moving the valve member.

Figure 8:
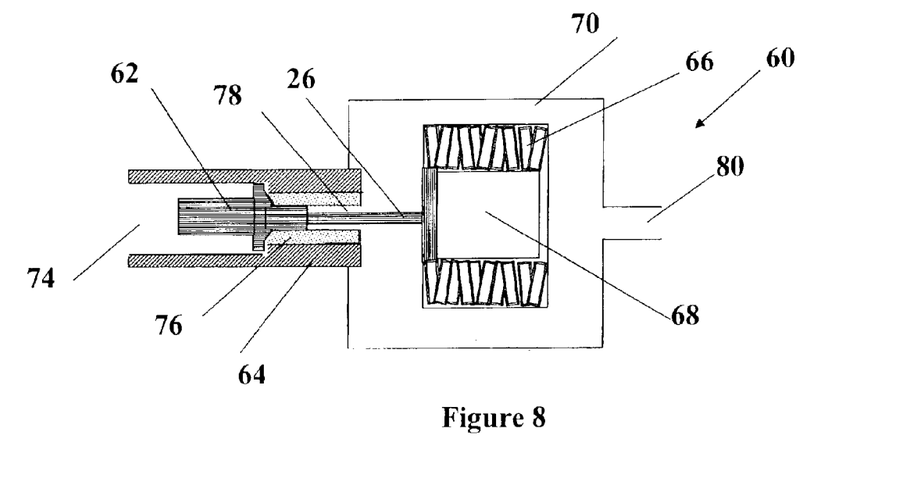
FIGS. 8 and 9 show the permeable valve assembly incorporated into a regulator using a bellows system for expansion and contraction that translates movingly engageable movement to the valve assembly.
Figure 9:
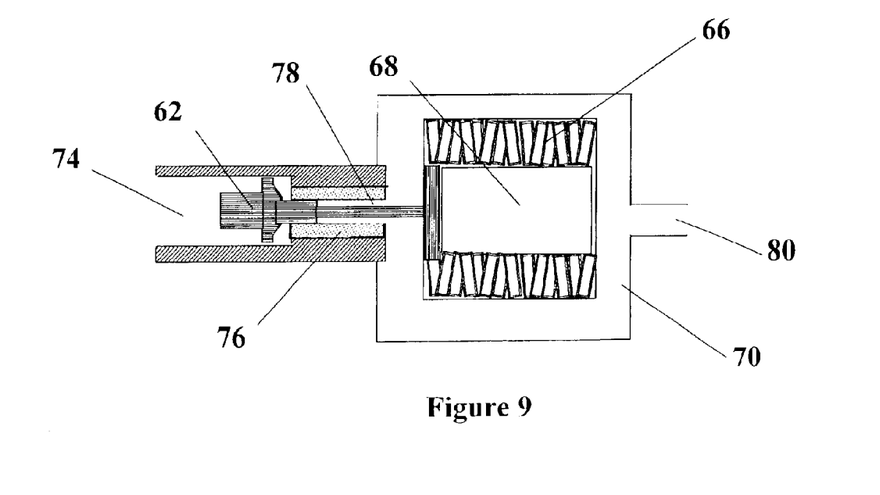

The valve assembly of the present invention is applicable for inclusion is several systems such as shown in FIGS. 8 and 9. The permeable valve assembly can be included in a regulator 60 that include a bellow system 66 and an interior chamber 68 that is directly attached to the small diameter extension 26. A pressure differential facilitates movement of the valve member into or away from the permeable valve seat member 64. In the alternative, the surrounding chamber is directly attached to the valve seat member which is then move into or away from the valve member.

If the pressure in the chamber 70 is greater than the pre-selected pressure within the internal volume 68, a diaphragm system attached to the valve member 62 will contract and the valve member will be urged towards the valve seat member 64 to prevent fluid flow through the permeable material of the valve assembly. Basically the diaphragm 66 is compressed forcing the valve member 62 to move towards the valve seat to sealingly engage therewith. Once the fluid pressure in chamber 70 subsides, the diaphragm system can expand, as shown in FIG. 9, with the concomitant unseating of the valve member to establish fluid flow through the permeable insert in the valve seat member to the outflow port 78, through chamber 70 and on to the processing tool at 80.

The permeable valve assembly of the present invention may be used in any system that reduces highly-pressurized gas in a cylinder or process line to a lower, useable level as the gas passes through another piece of equipment that uses a valve poppet. The system may further comprise a bellow system or springs that react to a pressure differential to open and close the valve poppet.

That which is claimed is:

1. A permeable fluid valve assembly for delivery of a fluid from a fluid source to a downstream processing tool comprising:

an inlet port for communication with an outlet of a fluid source for flowing fluid from the fluid source; and a permeable valve device positioned downstream from the fluid source comprising a valve member and a permeable valve seat member, wherein the valve device is adapted for movement between a sealing position that blocks fluid flow through the inlet port and an open position that permits fluid flow through the inlet port and valve device, wherein the valve member has a first end and a second end and the first end is positioned in the inlet port, wherein the valve seat member has an abutting first end having an outflow bore therethrough for acceptance of an extension attached to at least a section of the second end of the valve member, and wherein the abutting first end of the valve seat member comprises an insert that is conformingly configured for engagement with the second end of the valve member and fabricated of a fluid permeable material for transference of the fluid from the fluid source through the inlet port and the permeable section of the valve seat member to the downstream processing tool when the valve device is in the open position.

2. The permeable fluid valve assembly according to claim 1, wherein the fluid source is a pressurized tank.

3. The permeable fluid valve assembly according to claim 2, wherein the valve member is an elongated structure comprising a first end extension having a reduced cross-section relative to the inlet port to provide sufficient area for passing fluid through the inlet port around the valve member to pass through the permeable section of the valve seat member.

4. The permeable fluid valve assembly according to claim 3, wherein the valve seat member further comprises an outflow bore through the section fabricated of the fluid permeable material in the valve seat member for receiving a pin extension attached to the second end of the valve member, wherein the pin sealingly fits within the bore to allow movement in the bore but substantially reduces fluid passage through the bore from the fluid source.

5. The permeable fluid valve assembly according to claim 4, further comprising a chamber surrounding a diaphragm that defines an interior volume isolated from pressure conditions upstream of the valve element and engaged with the pin of the valve member to control the movement of the valve member in a manner that retains the valve member in the sealing position until a pressure differential between the interior volume of the diaphragm and the interior of the chamber moves the valve member to the open position.

6. The permeable fluid valve assembly according to claim 5, further comprising resilient means positioned near the first end of the valve member and holding the valve member in the sealing position.

7. The permeable fluid valve assembly according to claim 4, wherein the pin extension has a reduced cross-section tip to provide sufficient space in the outflow bore for filling of the fluid source when the valve member is moved to the filly open position.

8. The permeable fluid valve assembly according to claim 1, wherein the permeable section is an insert surrounding the outflow bore that traverses through the valve seating member.

9. A method for discharging fluid from a fluid source container to a downstream processing tool while reducing uncontrolled discharge of fluid from the container, the method comprising:

connecting an outlet port of a fluid source container to an inlet port of a valve assembly device comprising a valve member and a permeable valve seat member, wherein the valve device is adapted for movement between a sealing position that blocks fluid flow through the inlet port and an open position that permits fluid flow through the inlet port and valve device, wherein the valve member has a first end and a second end and the first end is positioned in the inlet port, wherein the valve seat member has an abutting first end having an outflow bore therethrough for acceptance of an extension attached to at least a section of the second end of the valve member, and wherein the abutting first end of the valve seat member comprises an insert that is conformingly configured for engagement with the second end of the valve member and fabricated of a fluid permeable material for transference of the fluid from the fluid source through the inlet port and the permeable section of the valve seat member to the downstream processing tool when the valve device is in the open position; and flowing fluid from the fluid source container through the inlet port, permeable valve seat member, outflow port to a downstream processing tool.

10. A permeable valve assembly for controlling gas delivery from a higher pressure fluid source to a lower pressure processing tool comprising:

an inlet port for communication with an outlet of the fluid source for flowing fluid from the fluid source;

a valve poppet movingly engageable with a valve seating member, wherein the valve poppet has a first end and a second end and the first end is positioned in the inlet port; and a fluid permeable insert positioned between the second end of the valve poppet and the valve seating member, wherein the fluid permeable insert is isolated from flowing fluid when the valve poppet is sealingly engaged with the valve seating member thereby preventing fluid flow through the valve assembly, wherein the fluid permeable insert provides a diffusional path for transfer of all flowing fluid from the higher pressure fluid source when the valve poppet is not sealingly engaged with the valve seating member, and wherein the permeable insert can be inserted into the sealable and engageable surface of either the valve seat member or the second end of the valve poppet.

11. A permeable fluid valve assembly for delivery of a fluid from a fluid source to a downstream processing tool comprising;

an inlet port for communication with an outlet of a fluid source for flowing fluid from the fluid source; and a valve device positioned downstream from the fluid source comprising a valve member and a valve seat member, wherein the valve device is adapted for movement between a sealing position that blocks fluid flow through the inlet port and an open position that permits fluid flow through the inlet port and valve device, wherein the valve member has a first end and a second end, wherein the first end is positioned in the inlet port, wherein the valve seat member has an abutting first end having a bore therethrough for acceptance of an extension attached to at least a section of the second end of the valve member, and wherein the extension at the second end of the valve member is fabricated of a fluid permeable material for transference of the fluid from the fluid source through the inlet port, the permeable extension of the valve member and the outflow bore of the valve seat member to the downstream processing tool when the valve device is in an open position.

12. The permeable fluid valve assembly according to claim 11, wherein the fluid source is a pressurized tank.

13. The permeable fluid valve assembly according to claim 11, wherein the valve member is an elongated structure comprising a first end extension having a reduced cross-section relative to the inlet port to provide sufficient area for passing fluid through the inlet port around the valve member to pass through the permeable section of the valve seat member.

14. The permeable fluid valve assembly according to claim 13, wherein the valve seat member further comprises a bore through the section fabricated of the fluid permeable material in the valve seat member for receiving a pin extension attached to the second end of the valve member, wherein the pin sealingly fits within the bore to allow movement in the bore but substantially reduces fluid passage through the bore from the fluid source.

15. The permeable fluid valve assembly according to claim 14, further comprising a chamber surrounding a diaphragm that defines an interior volume isolated from pressure conditions upstream of the valve element and engaged with the pin of the valve member to control the movement of the valve member in a manner that retains the valve member in the sealing position until a pressure differential between the interior volume of the diaphragm and the interior of the chamber moves the valve member to the open position.

16. The permeable fluid valve assembly according to claim 15, further comprising resilient means positioned near the first end of the valve member and holding the valve member in the sealing position.

17. The permeable fluid valve assembly according to claim 14, wherein the pin extension has a reduced cross-section tip to provide sufficient space in the outflow bore for filling of the fluid source when the valve member is moved to the fully open position.

18. A method for discharging fluid from a fluid source container to a downstream processing tool while reducing uncontrolled discharge of fluid from the container, the method comprising:

connecting an outlet port of a fluid source container to an inlet port of a valve assembly device comprising a valve member and a valve seat member, wherein the valve device is adapted for movement between a sealing position that blocks fluid flow through the inlet port and an open position that permits fluid flow through the inlet port and valve device, wherein the valve member has a first end and a second end, wherein the first end is positioned in the inlet port, and wherein the valve seat member has an abutting first end having a outflow bore therethrough for acceptance of an extension attached to at least a section of the second end of the valve member, and wherein the extension at the second end of the valve member is fabricated of a fluid permeable material for transference of the fluid from the fluid source container through the inlet port, through the permeable extension of the valve member and the outflow bore of the valve seat member to the downstream processing tool when the valve device is in an open position; and flowing fluid from the fluid source container through the inlet port, permeable valve member extension, outflow port to a downstream processing tool.

19. A permeable valve assembly for controlling gas delivery from a higher pressure fluid source to a lower pressure processing tool, said permeable valve assembly comprising a valve poppet movingly engageable with a valve seating member, and a fluid permeable insert positioned between the valve poppet and the valve seating member, wherein the fluid permeable insert is isolated from flowing fluid when the valve poppet is sealingly engaged with the valve seating member thereby preventing fluid flow through the valve assembly, wherein the fluid permeable insert provides a diffusional path for transfer of all flowing fluid from the higher pressure fluid source when the valve poppet is not sealingly engaged with the valve seating member, and wherein the fluid permeable insert comprises a vapor/gas-permeable and liquid-impermeable material and can be inserted into the sealable and engageable surface of either the valve seat member or the valve poppet.

* * * * *